US009326140B2

(12) United States Patent
Zheng et al.

(10) Patent No.: US 9,326,140 B2
(45) Date of Patent: Apr. 26, 2016

(54) METHOD AND SYSTEM FOR IMPLEMENTING AN ADVANCED MOBILE AUTHENTICATION SOLUTION

(71) Applicant: Oracle International Corporation, Redwood Shores, CA (US)

(72) Inventors: Huijun Zheng, Parker, CO (US); Sanjeev Kumar Sharma, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 35 days.

(21) Appl. No.: 13/754,864

(22) Filed: Jan. 30, 2013

(65) Prior Publication Data

US 2013/0198814 A1     Aug. 1, 2013

Related U.S. Application Data

(60) Provisional application No. 61/593,069, filed on Jan. 31, 2012.

(51) Int. Cl.
*G06F 15/16* (2006.01)
*H04L 29/06* (2006.01)
*H04W 12/06* (2009.01)
*H04W 12/08* (2009.01)
*G06F 21/00* (2013.01)
*G06F 15/173* (2006.01)

(52) U.S. Cl.
CPC .............. *H04W 12/06* (2013.01); *H04W 12/08* (2013.01)

(58) Field of Classification Search
CPC ....... H04L 63/08; H04L 63/10; H04L 63/102; G06F 21/6218; H04W 12/06
USPC .......... 713/168–174, 182–186, 202; 709/225, 709/229; 726/2–8
See application file for complete search history.

(56) References Cited

U.S. PATENT DOCUMENTS

| | | | | |
|---|---|---|---|---|
| 2005/0283615 | A1* | 12/2005 | Chakravarthi | .......... H04L 63/08 713/182 |
| 2007/0240206 | A1* | 10/2007 | Wu et al. | ............................. 726/8 |
| 2011/0314513 | A1* | 12/2011 | Carter | .................... G06Q 10/06 726/1 |

* cited by examiner

*Primary Examiner* — Evans Desrosiers
(74) *Attorney, Agent, or Firm* — Vista IP Law Group, LLP (57) ABSTRACT

Disclosed is an improved method, system, and program product to implement a login interface that collects additional information (in addition to the username and password) to be used in the login process. The additional information may include role and environment information specifying the privileges or resources in an application that the user may access.

26 Claims, 7 Drawing Sheets

METHOD AND SYSTEM FOR IMPLEMENTING AN ADVANCED MOBILE AUTHENTICATION SOLUTION

CROSS-REFERENCE TO RELATED APPLICATIONS

The present application claims the benefit of priority to U.S. Provisional Application Ser. No. 61/593,069, filed on Jan. 31, 2012, which is hereby incorporated by reference in its entirety.

BACKGROUND AND SUMMARY

Many types of computing applications require some sort of user authentication before allowing a user to access the application. Commonly, a username and password is collected to perform the authentication processing. The username is checked to verify that the user is properly registered in the system, and the password is verified to make sure that it is the correct password associated with the username. The user is prevented from using the computing application until the username and password has been properly verified.

The issue addressed by the present disclosure is that in traditional mobile applications, only the user name and password are collected from an end user in a login page. However, additional information besides the username and password is often required during the login process and/or would be useful to collect even if not required.

The problem is that there is no standard-based framework available to allow a mobile application to collect additional information in a login page and to use them in the login process. In fact, standard web-based authenticators (such as the Java Authentication and Authorization Service or "JAAS") are configured to accept only the username and password.

Therefore, there is a need for an improved method, system, and computer program product that addresses these problems with the prior authentication solutions.

SUMMARY

Some embodiments of the invention address the above problems by providing an approach to implement a login interface at a mobile application that collects additional information other than the username and password to be used in the login process. In one aspect, a method according to the invention receives, at a mobile authenticator, login information from a user at a mobile device, comprising username, password, and the additional information. The user is then authenticated based on the username and password, and a determination is made as to whether the user has permission to access resources or privileges based upon the additional information. If the user has permission, resources specified by the additional information are then identified, and the user is allowed to access the mobile application with the identified resources and privileges.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of mobile applications that receive additional role and environment information. It is noted, however, that the invention is not limited in its scope to these types of applications and this set of additional information, and indeed, may be applied to other types of applications and information as well.

As noted above, the issue addressed by the present disclosure is that in traditional mobile applications, only the user name and password is collected from an end user in a login page. However, additional information besides the username and password is often required during the login process and/or would be useful to collect even if not required.

For example, some applications also seek information about the user's "role" and access "environment", where this information is also used in the login process to provide the user access to the computing system/application.

The role information identifies a user's role when operating the application, which effectively associates the user to a certain set of computing privileges, e.g., to take certain actions or to view certain data. For example, a user of a business application may be associated with either a role as an "employee" or "manager", where the manager role provides for greater rights to access restricted data or to take certain actions that are otherwise not permitted to the employee role. To explain, consider a business application that handles expense reports. The employee role may allow the user to enter the expense report, but only the manager role may be associated with privileges to approve expense reports. Therefore, a user that is a manager (but is also an employee of a company and therefore eligible to have both the employee role and the manager role) may choose to log into the system with either role depending upon the tasks to be performed by the user.

In some embodiments, a user of an application may have roles associated with different projects, such as "project A member" or "project B member," wherein members of each project are allowed certain actions and privileges associated with that particular project. A user who is a member of more than one of such projects may wish to log in to the system with a specific project role when performing tasks for that project, without having to worry about accidentally performing actions that will affect another project. In some embodiments, a user also has the option to log in with the privileges of all of his available roles.

The environment information pertains to the operating environment under which an application will run. For example, a computing application may be configured to run under either a normal production environment or a testing environment. Both environments may be associated with different sets of computing resources, e.g., a production database for the production environment and test database for the testing environment. Therefore, a user that needs to access one of these two environments should be able to designate the correct environment at login time so that the correct set of resources is presented to that user.

The present embodiment provides a standard-based framework to allow a mobile application to collect the additional information (besides just the username and password) in a login page and to use the additional information in the login process. For example, role and environment information may be collected during the login process. The solution is based on industrial standards, such as JAAS and Web Service WS-Security.

Figure 1:
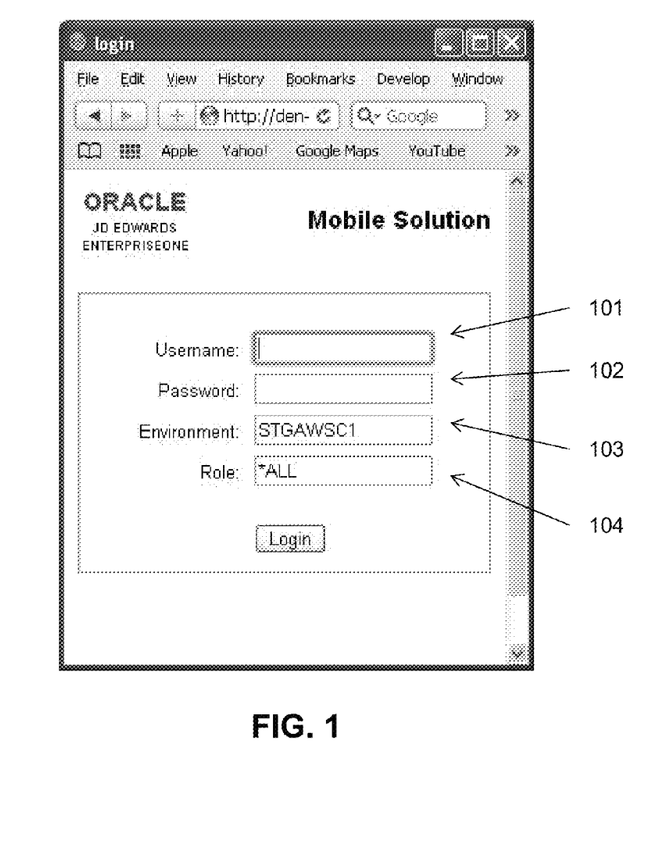
FIG. 1 illustrates a login page for implementing an authentication solution according to embodiments of the invention.

FIG. 1 illustrates an example interface (e.g., login page) for a mobile application, which shows four fields—username 101, password 102, environment 103, and role 104. The two additional fields are "Environment" and "Role", whose values are used to determine the environment information and role associated with the user, e.g., the backend data source and user privilege, etc. In some embodiments, these values can be defaulted in the login page based on system configuration. For example, in FIG. 1, the role field 104 has been set to a default value of "*ALL," allowing for an end user to access all of his available roles. It is noted that additional fields in the invention are not limited to just environment and role.

Figure 2:
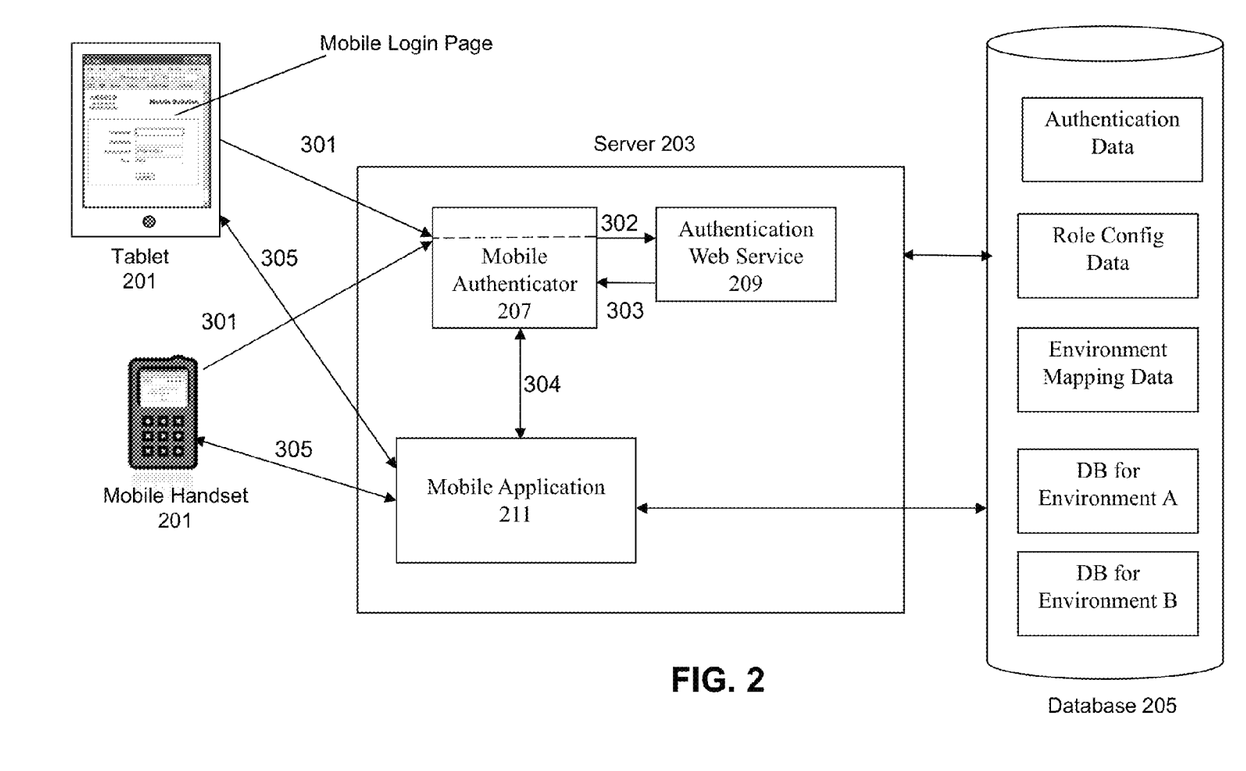
FIG. 2 illustrates a system for implementing an authentication solution according to embodiments of the invention.

FIG. 2 shows an architecture of a system for implementing a login interface that collects additional information (in addition to the username and password) to be used in the login process. The system may include one or more users at one or more mobile devices 201, such as a tablet device or mobile telephone device. The tablet device may comprise any type of portable device, including for example, tablet computers, portable readers, PDAs, etc. The mobile telephone device may comprise any mobile device that can suitably access an application on application server, such as smartphones and programmable mobile handsets. It is noted that the invention is not limited in its application to just these types of devices.

The users operate the system to access mobile application web services, e.g., to perform business services on an application server 203, which may access database 205 to implement the business services. Application server 203 may comprise a mobile authenticator 207, an authentication web service 209, and a mobile application 211 that is desired to be accessed by the end user. The database 205 corresponds to any type of computer readable mediums or storage devices.

The computer readable storage devices may comprise any combination of hardware and software that allows for ready access to the data within database. For example, the computer readable storage device could be implemented as computer memory or disk drives operatively managed by an operating system. Database 205 may comprise backend systems containing authentication data for authenticating usernames and passwords, role configuration data for a plurality of roles, and environment mapping data that maps environments to database resources associated with the environment. In addition, database 205 may comprise database resources for each individual environment. For simplicity, database 205 is illustrated as a single database, but it is understood that database 205 may comprise a plurality of databases in a plurality of locations. In addition, database 205 may comprise backend logic servers or database middleware that processes and manipulates data that is sent to or received from application server 203.

Figure 3:
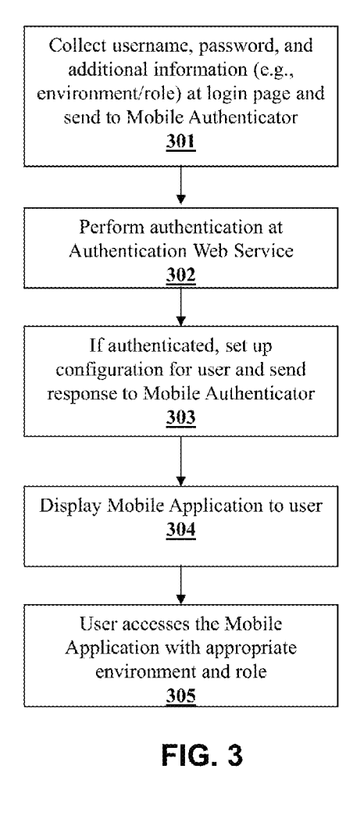
FIG. 3 illustrates a flowchart of an approach for implementing an authentication solution according to embodiments of the invention.

As described in the flowchart of FIG. 3, during 301 of the login process, a mobile authenticator 207 retrieves values for username, password, environment and role submitted by an end user using a mobile device 201, such as a tablet or a mobile handset. This information may be collected at a login page that is displayed to the end user on mobile device 201. In some embodiments, the mobile authenticator 207 may use the JAAS standard. The actions taken by the mobile authenticator are described in more detail below and in FIG. 4.

At 302, the mobile authenticator 207 invokes an authentication web service 209 to authenticate the user against authentication data stored in database 205. In effect, the present architecture bypasses the mobile authenticator since the most standard authenticators such as those using the JAAS standard do not account for the additional values. Instead, the login information is passed as values to the authentication web service 209 to perform the actual authentication. In some embodiments, these values are sent in the Simple Objection Access Protocol (SOAP) header, as part of the web service request, following the WS-Security standard. The authentication web service 209 checks the authentication data for the user at the backend system in database 205 to authenticate the user.

If the user is authenticated, then at 303, configuration data is set up for the user based at least in part upon the role and/or environment information submitted by the user. For example, a session may be configured for user access of the mobile application web services, where the session is configured to access resources corresponding to a specific environment. Environment mapping data may exist to map certain resources to specific environments, e.g., a test database may be associated with a test environment and a production database is associated with a test environment. Similarly, the user's role may be configured for the current session using the role information provided by the user. A response may be provided in 303 to the mobile authenticator. The actions taken by the authentication web service 209 and the backend system in database 205 are described in additional detail below and in FIG. 5.

At 304, the mobile application 211 may then be displayed to the user on the tablet device, PDA, or mobile telephone device 201. The tablet device and mobile telephone 201 therefore comprises a display device, such as a display monitor or screen, for displaying information to users. The tablet device and/or mobile device 201 may also comprise one or more input devices for the user to provide operational control over the activities of system, such as a mouse, touch screen, keypad, or keyboard. The users of the tablet device and/or mobile device correspond to any individual, organization, or other entity that uses system to remotely access applications on application server.

At 305, the user accesses the mobile application 211 with the appropriate environment and role configured for that user. For example, the mobile application 211 accesses the backend resources at database 205 appropriate for the designated environment. In addition, the user operates the mobile application 211 with the privileges associated with the designated role. The actions taken by the mobile application 211 are described in additional detail below and in FIG. 6.

Figure 4:
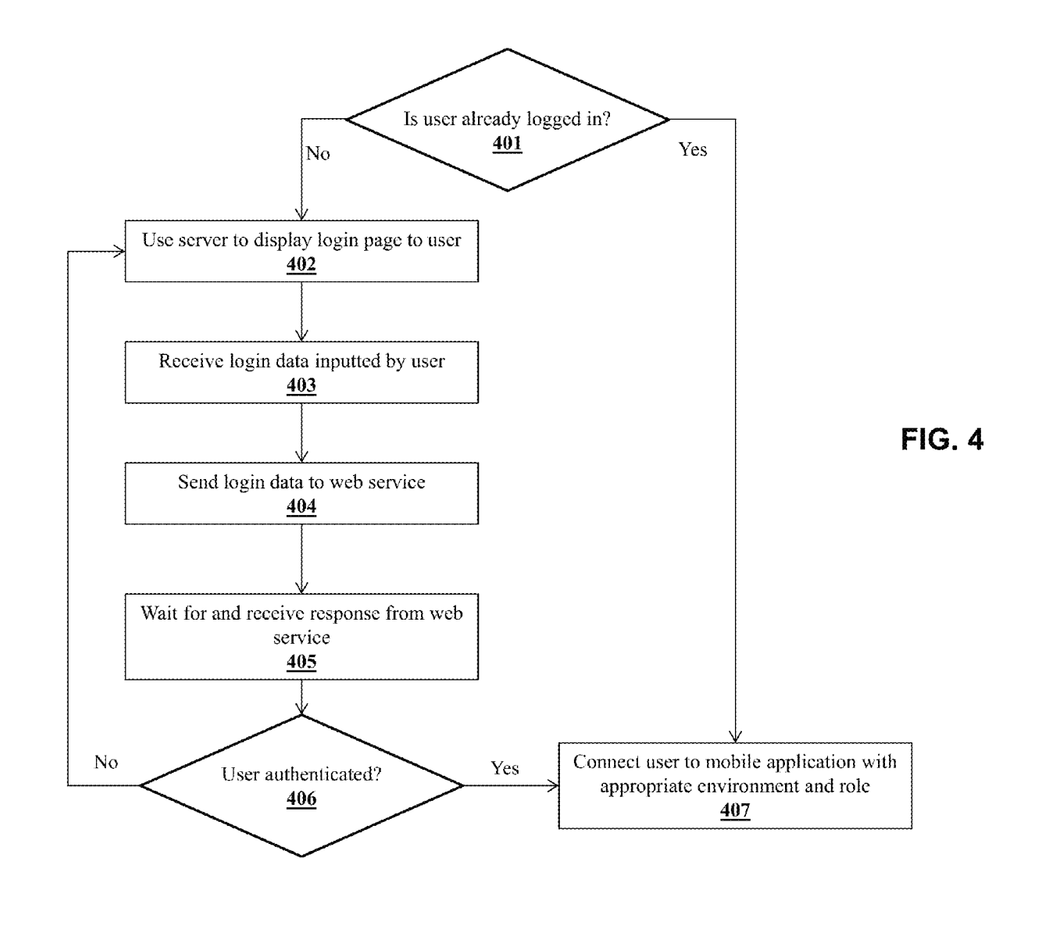
FIG. 4 illustrates a flowchart of actions taken by a mobile authenticator according to embodiments of the invention.

FIG. 4 describes the process taken by the mobile authenticator 207. At 401, the mobile authenticator first determines whether the user is already logged into the mobile application. If the end user is determined to be already logged in, the process may then proceed directly to 407, where the user is connected to the mobile application with the appropriate environment and role from the previous log-in.

However, if it is determined that the user is not already logged in, the process proceeds to 402, where the mobile authenticator uses the server 203 to display a login page at mobile device 201 where the user is able to input login information. The login page may be the one illustrated in FIG. 1, allowing for the user to enter a username, password, environment, and role. At 403 and 404, login information entered by the user at the displayed login page is received by the mobile authenticator 207 and sent to the authentication web service 209. The mobile authenticator then waits for a response from the authentication web service at 405.

Figure 5:
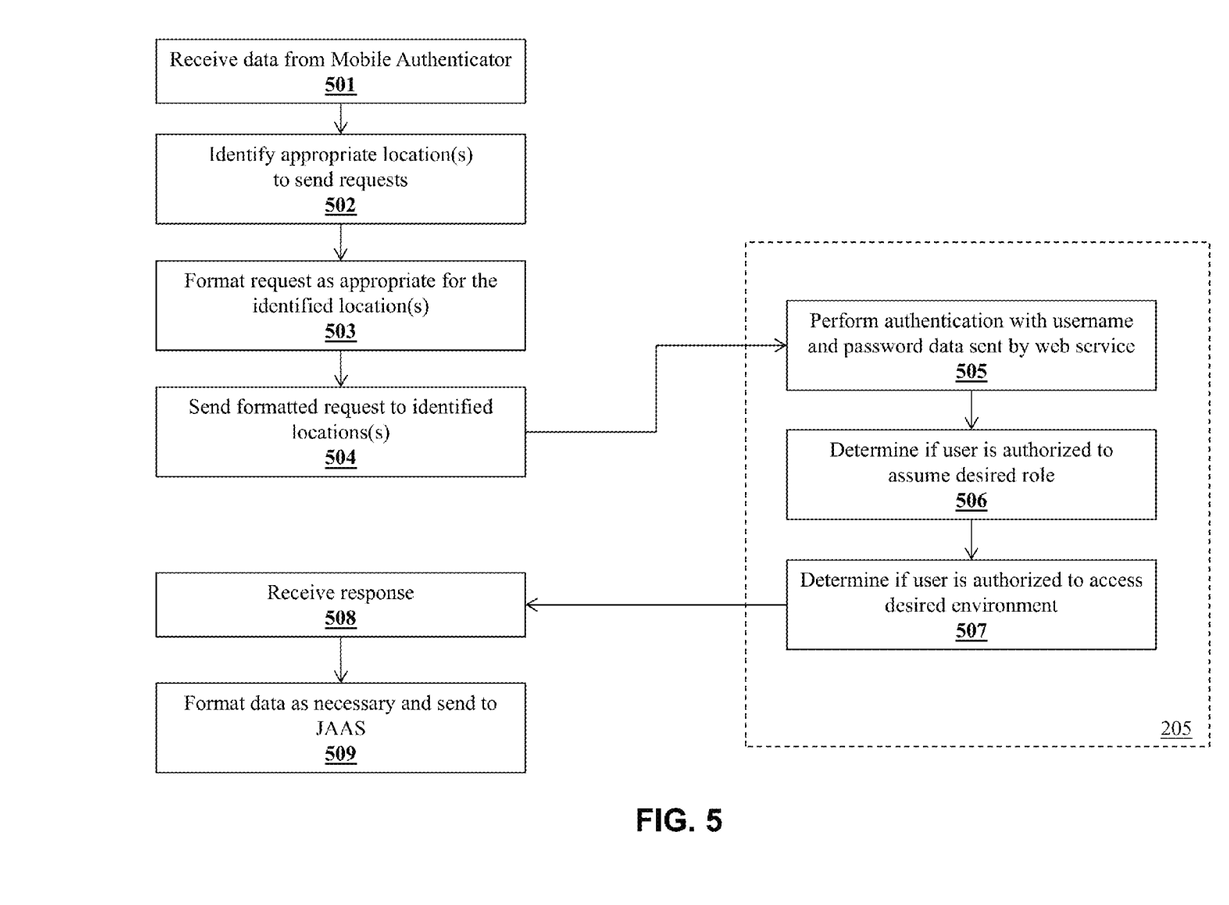
FIG. 5 illustrates a flowchart of actions taken by a authentication web service according to embodiments of the invention.

FIG. 5 illustrates the process taken by the authentication web service 209 and database 205 to authenticate the user. At 501, the authentication web service receives the login data from the mobile authenticator 207, comprising username, password, environment and role information. Once data is received, an appropriate location in database 205 containing the needed authentication data is identified at 502. In some embodiments, the identified location may be a backend application server. In other embodiments, the location may be a specialized authentication server. Depending on whether the location requires data to be sent in a specific format, the data is then formatted as necessary at 503 and sent to the identified location at 504.

At 505, the backend systems in database 205 may perform authentication using the received username and password data and the stored authentication data. If the user is authenticated, then at 506, a determination is made as to whether the user is authorized to assume the desired role by checking the username and desired role with role configuration data contained in database 205. Not all users, even when authenticated, will be able to assume all roles. For example, a particular user might be able to assume a manager role, a developer role, and a project team A role, but will not be able to assume a project team B role. Each role may have access different applications or have different privileges within an application. For example, assuming the manager role may allow a user to view, modify, and delete data in an application, but assuming the project team A role might only allow for the viewing of data in the application, but not modifying or deleting. The role configuration data in database 205 contains data as to which roles a user has access to, and is used to verify that the user is able to assume the desired role.

At 507, a determination is made as to whether the user is to access the desired environment. A particular user might be allowed to access certain environments, but not other environments. For example, if a user is a member of the testing department, he may be allowed to access a testing environment, but not a production environment or a marketing environment. Each of these environments may be associated with different databases. For example, it may be desirable for a testing environment to contain data that is not accessible from the marketing environment. The environment mapping data in database 205 contains data as to which environments a particular user has access to, and is used to verify that the user is able the access the desired environment. The environment mapping data may also contain metadata specifying which databases and resources in database 205 are associated with a particular environment and the location of those databases and resources.

The results of the authentication are then sent back to the authentication web service. The response to the web service authentication may also comprise role and/or environment metadata specifying the privileges available for the requested role and/or the databases and resources associated with the requested environment. The authentication web service 209 receives the response at 508, and then formats it as necessary to be returned to the mobile authenticator 207.

Once a response is received, the mobile authenticator determines whether the end user has been authenticated at 406. If the end user has been authenticated, then the end user is connected to the mobile application with the appropriate environment and role information at 407. Else, the mobile authenticator may return to 402, re-displaying the login page to the user at mobile device 201, and prompting the user to input new login information.

Figure 6:
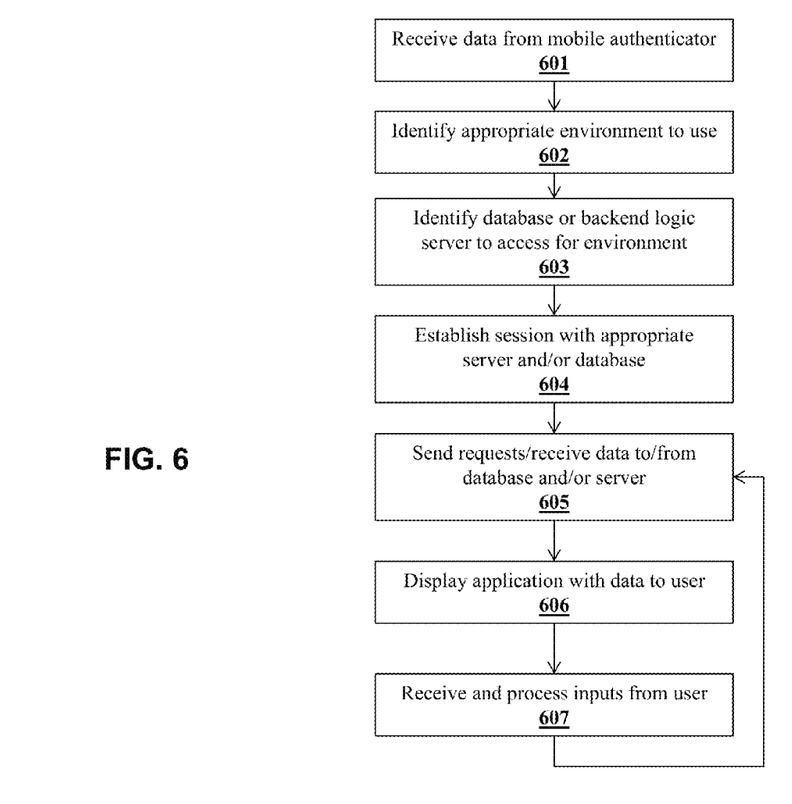
FIG. 6 illustrates a flowchart of actions taken by a mobile application according to embodiments of the invention.

FIG. 6 illustrates the steps taken by the mobile application 211. At 601, the mobile application 211 receives data from the mobile authenticator 207 with the appropriate environment and role information. At 602 and 603, using environment metadata, the application then identifies the appropriate environment to use and the appropriate location to access for the environment. The location may comprise a database or a backend logic server. In some embodiments, the mobile application may directly access a database containing the data for the environment. In other embodiments, a backend logic server associated with the environment may perform additional logic on data before passing it to the mobile application.

In some embodiments, the mobile application 211 receives the environment metadata from the mobile authenticator 207 at 601. In other embodiments, the mobile application 211 obtains the environment metadata by accessing the environment mapping data in database 205 and using the environment information received from the mobile authenticator to look up the correct metadata.

Once the necessary database or server is identified, the application establishes a session with the database or server for the requested environment at 604. The application sends requests to receive data from the database or server at 605, and displays the received data to the user at 606. The application then receives and processes inputs from the user, and in response to the inputs, requests and receives data from the database or server to be displayed to the user (607, 605, and 606).

Therefore, the present disclosure has provided a new approach for implementing an industrial standard-based solution that allows additional information besides username and password to be collected from an end user. The additional information can be defaulted in the login page based on configuration or user preference, and the user is capable of modifying the values.

The additional information will be used during login process, where the solution can enhance the user experience, provides additional functionality, and serves to reduce administration cost.

System Architecture Overview

Figure 7:
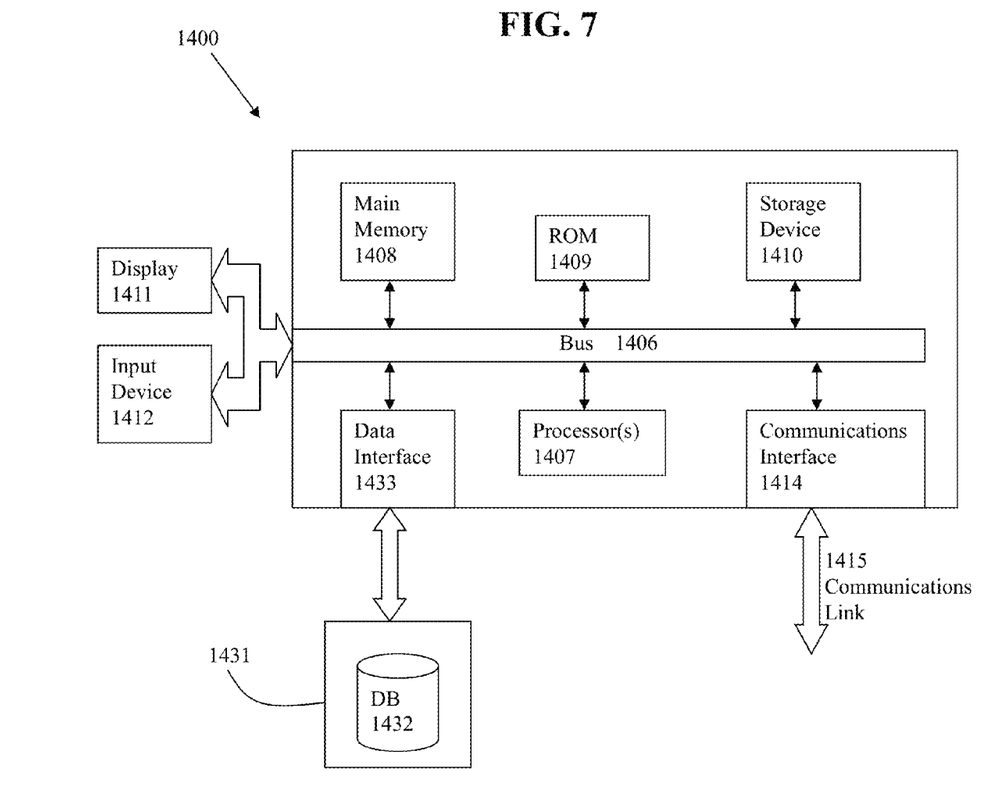
FIG. 7 depicts a computerized system on which an embodiment of the invention can be implemented.

FIG. 7 is a block diagram of an illustrative computing system 1700 suitable for implementing an embodiment of the present invention. Computer system 1700 includes a bus 1706 or other communication mechanism for communicating information, which interconnects subsystems and devices, such as processor 1707, system memory 1708 (e.g., RAM), static storage device 1709 (e.g., ROM), disk drive 1710 (e.g., magnetic or optical), communication interface 1714 (e.g., modem or Ethernet card), display 1711 (e.g., CRT or LCD), input device 1712 (e.g., keyboard), and cursor control.

According to one embodiment of the invention, computer system 1700 performs specific operations by processor 1707 executing one or more sequences of one or more instructions contained in system memory 1708. Such instructions may be read into system memory 1708 from another computer readable/usable medium, such as static storage device 1709 or disk drive 1710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1707 for execution. Such a medium may take many forms, including but not limited to, non-volatile media and volatile media. Non-volatile media includes, for example, optical or magnetic disks, such as disk drive 1710. Volatile media includes dynamic memory, such as system memory 1708.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1700. According to other embodiments of the invention, two or more computer systems 1700 coupled by communication link 1715 (e.g., LAN, PTSN, or wireless network) may perform the sequence of instructions required to practice the invention in coordination with one another.

Computer system 1700 may transmit and receive messages, data, and instructions, including program, i.e., application code, through communication link 1715 and communication interface 1714. Received program code may be executed by processor 1707 as it is received, and/or stored in disk drive 1710, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for authenticating a user for a mobile application using additional information beyond username and password information, comprising:
  receiving, at a mobile authenticator, login information from the user at a mobile device, wherein the login information is user specified at the mobile device and the login information comprises a username, a password, and additional information, the additional information comprising environment information and role information, the environment information corresponding to a selection of an environment from a plurality of selectable environments in a user interface and to an operating environment under which an application operable for the user is run, and the role information corresponding to selection of a role from a plurality of selectable roles from the user interface and to the role of the user when operating the application;
  using the username and password to authenticate the user;
  determining if the user has permission to access a resource and assume a privilege based at least in part on the additional information, wherein the additional information provided at the mobile device is associated with a subset of all privileges of the user;
  identifying the resource specified by the additional information; and
  allowing the user to access the resource using the mobile application with the subset of all privileges.

2. The method of claim 1, wherein the role information specifies a set of computing privileges available to the user.

3. The method of claim 1, wherein environment information specifies computing resources available to the user.

4. The method of claim 3, wherein the user is given access to different databases depending on the environment information.

5. The method of claim 1, wherein the method is executed only after a determination is made that the user is not already logged in.

6. The method of claim 1, wherein the mobile authenticator uses a Java Authentication and Authorization Service (JAAS) standard.

7. The method of claim 1, wherein the mobile authenticator sends the login information to an authentication web service.

8. The method of claim 7, wherein the authentication web service determines a backend location to send the login information.

9. A system for authenticating a user for a mobile application using additional information beyond username and password information, comprising:
  a mobile device from which the user can enter login information comprising a username, a password, and additional information, the additional information comprising environment information and role information, the environment information corresponding to a selection of an environment from a plurality of selectable environments in a user interface and to an operating environment under which an application operable for the user is run, and the role information corresponding to selection of a role from a plurality of selectable roles from the user interface and to the role of the user when operating the application;
  a remote authentication service configured to receive the login information entered by the user at the mobile device, wherein the remote authentication service uses the username and password to authenticate the user, and determines if the user has access to one or more resources and privileges based at least in part upon the additional information, wherein the additional information provided at the mobile device is associated with a subset of all privileges of the user; and a mobile application accessible to the user through the mobile device, wherein the mobile application receives data from the remote authentication service and allows the user to access appropriate resources with appropriate privileges based at least in part on the data.

10. The system of claim 9, wherein role information specifies a set of computing privileges available to the user.

11. The system of claim 9, wherein environment information specifies computing resources available to the user.

12. The system of claim 11, wherein the user is given access to different databases depending on the environment information.

13. The system of claim 9, wherein the authentication service first determines if the user is already logged in.

14. The system of claim 9, wherein the authentication service comprises a mobile authenticator and an authentication web service.

15. The system of claim 14, wherein the mobile authenticator uses a Java Authentication and Authorization Service (JAAS) standard.

16. The system of claim 14, wherein the mobile authenticator sends the login information to an authentication web service.

17. The system of claim 14, wherein the authentication web service determines a backend location to send the login information.

18. The system of claim 17, wherein the backend location uses the username and password to authenticate the user, and determines if the user has access to the one or more resources and privileges based at least in part upon the additional information.

19. The computer program product of claim 18, wherein the role information specifies a set of computing privileges available to the user.

20. The computer program product of claim 18, wherein environment information specifies computing resources available to the user.

21. The computer program product of claim 20, wherein the user is given access to different databases depending on the environment information.

22. A computer program product including a non-transitory computer readable medium having instructions which, when executed by a processor, causing the processor to perform a process for authenticating a user for a mobile application using additional information beyond username and password information, the process comprising:

receiving, at a mobile authenticator, login information from the user at a mobile device, wherein the login information is user specified at the mobile device and the login information comprises a username, a password, and additional information, the additional information comprising environment information and role information, the environment information corresponding to a selection of an environment from a plurality of selectable environments in a user interface and to an operating environment under which an application operable for the user is run, and the role information corresponding to selection of a role from a plurality of selectable roles from the user interface and to the role of the user when operating the application;

using the username and password to authenticate the user;

determining if the user has permission to access a resource and assume a privilege based at least in part on the additional information, wherein the additional information provided at the mobile device is associated with a subset of all privileges of the user;

identifying the resource specified by the additional information; and allowing the user to access the resource using the mobile application with the subset of all privileges.

23. The computer program product of claim 22, wherein the process is performed only after a determination is made that the user is not already logged in.

24. The computer program product of claim 22, wherein the mobile authenticator uses a Java Authentication and Authorization Service (JAAS) standard.

25. The computer program product of claim 22, wherein the mobile authenticator sends the login information to an authentication web service.

26. The computer program product of claim 25, wherein the authentication web service determines a backend location to send the login information.

* * * * *